FIG. I

INVENTOR
A. E. BAILEY

Patented Apr. 28, 1953

2,637,027

UNITED STATES PATENT OFFICE 2,637,027

PULSE RADAR SYSTEM EMPLOYING THE DOPPLER EFFECT

Arthur E. Bailey, Malvern Link, England, assignor to the Minister of Supply in His Majesty's Government of the United Kingdom of Great Britain and Northern Ireland, London, England Application August 8, 1947, Serial No. 767,475
In Great Britain March 9, 1945

Section 1, Public Law 690, August 8, 1946
Patent expires March 9, 1965

8 Claims. (Cl. 343—11)

This invention relates to radiolocation or radar systems in which objects such as aircraft are detected by receiving the radio-frequency energy reflected by them when they are illuminated by a pulse-modulated radio wave.

The invention relates more particularly, though not exclusively, to systems of the kind in which received information is displayed on a cathode ray tube indicator such as that generally referred to as a plan position indicator. In such a system, the receiving aerial array has a relatively narrow polar diagram of reception, and is caused to rotate and scan in azimuth the area around the detecting station site. The echo signals received from re-radiating objects are displayed as intensity modulation on a cathode ray tube having a radial time base scan of which the angular position on the screen of the tube corresponds with the rotation of the aerial system. The distance along the scan from the centre of the screen represents the range of the target from the station, so that the signal indications on the screen of the tube represent the approximate plan position of all the various re-radiating objects which are giving rise to the signals, the centre of the screen representing in plan the position of the locating station. A signal display system of this kind will hereinafter be referred to as a P. P. I. (plan-position indicator).

In a radar system of the kind discussed in the preceding paragraph, a serious limitation arises due to the presence of undesired signals produced by reflection from the ground, neighbouring hills and buildings. These unwanted signals or "clutter" cause patches of light on the P. P. I. screen, particularly at the closer ranges, which mask signals from aircraft targets and make it difficult to observe the passage of such a target when its position coincides with a source of "clutter." Even in radar systems in which the vertical directivity of the aerials is such that they may be aligned to detect a target at such an altitude that ground reflections are not received, low flying targets will be lost due to ground "clutter."

The present invention is concerned with systems in which the difficulty in detecting moving targets coincident in range with objects giving rise to "clutter" is overcome by making use of the change in the radio frequency of returning echo signals from moving targets due to the Doppler effect.

The magnitude of the change in frequency of the returning echo signals due to the Doppler effect is proportional to the radio-frequency employed, and also to the radial velocity of the reflecting target relative to the detecting station. If the radio frequency of the transmitted exploring pulses is 200 mc./s. and the target is moving towards or away from the station at a speed of 200 miles an hour, the radio-frequency of the returning echo pulses will be changed by 120 cycles/second. Thus, for speeds which may normally be encountered, a frequency change of a detectable magnitude is produced. Such a change of frequency will be referred to as the Doppler frequency.

It has been found that beats at Doppler frequency can be produced in a receiver by mixing the incoming signal pulses with a locally-generated reference oscillation, it being arranged that there is at all times some pre-determined fixed relationship between the phase of the transmitted radio-frequency signals and the phase of the reference oscillation. In an already proposed arrangement of this kind, the source of reference oscillations operates at the receiver intermediate frequency and is caused to lock in phase at each transmitted pulse, for which purpose it is fed with intermediate-frequency pulses derived by mixing pulses from the transmitter with oscillations from the receiver local oscillator; the reference oscillation is then injected into the signal receiver in an intermediate-frequency stage or at the second detector.

The present invention has as its object to provide improved means for deriving a reference oscillation for mixing with received signals to give rise to a Doppler-frequency beat in the presence of a moving target.

The invention accordingly provides a pulse radar system comprising a superheterodyne receiver and an intermediate-frequency oscillator arranged to inject a reference oscillation into the intermediate-frequency amplifier or second detector of said receiver, wherein there are provided means for deriving from the receiver frequency changer pulsed intermediate-frequency oscillations whose phase is positively related to the phase of the transmitted signals, and means for causing said pulsed oscillations to control the phase of said oscillator.

There are always present in received signals, not only echo pulses from reflecting objects at various ranges, but also pulses occurring simultaneously with the transmitter pulses and due to the direct action of the transmitter on the receiver. Even in systems employing a common aerial system for transmissing and reception, in which means are provided for protecting the receiver when the transmitter pulse is operative, a residual transmitter pulse is passed on to the receiver circuits. The signals due to direct reception from the transmitter are conveniently extracted from other received signals by a gate circuit rendered operative by pulses derived from the transmitter.

The invention further provides a radar receiver comprising an intermediate-frequency amplifier-detector and an intermediate-frequency oscillator coupled to a stage in said amplifier-detector, wherein a gate circuit is connected between an earlier stage in said amplifier-detector and said oscillator, and a control circuit for said gate circuit is provided.

The present arrangements have the advantage of simplicity over previously proposed arrangements, in that the necessity for specific circuits for deriving controlling radio-frequency pulses from the transmitter and converting them to intermediate-frequency is avoided. Moreover, there is no possibility of the reference oscillator locking to any spurious signals which may be present in the transmitter circuits, since the gate circuit is closed at all times other than when the transmitter pulse is operative.

Reference is made to the drawing which is intended to be illustrative of the invention and is not intended to be limiting. Like numerals refer to like parts throughout.

Figure 1:
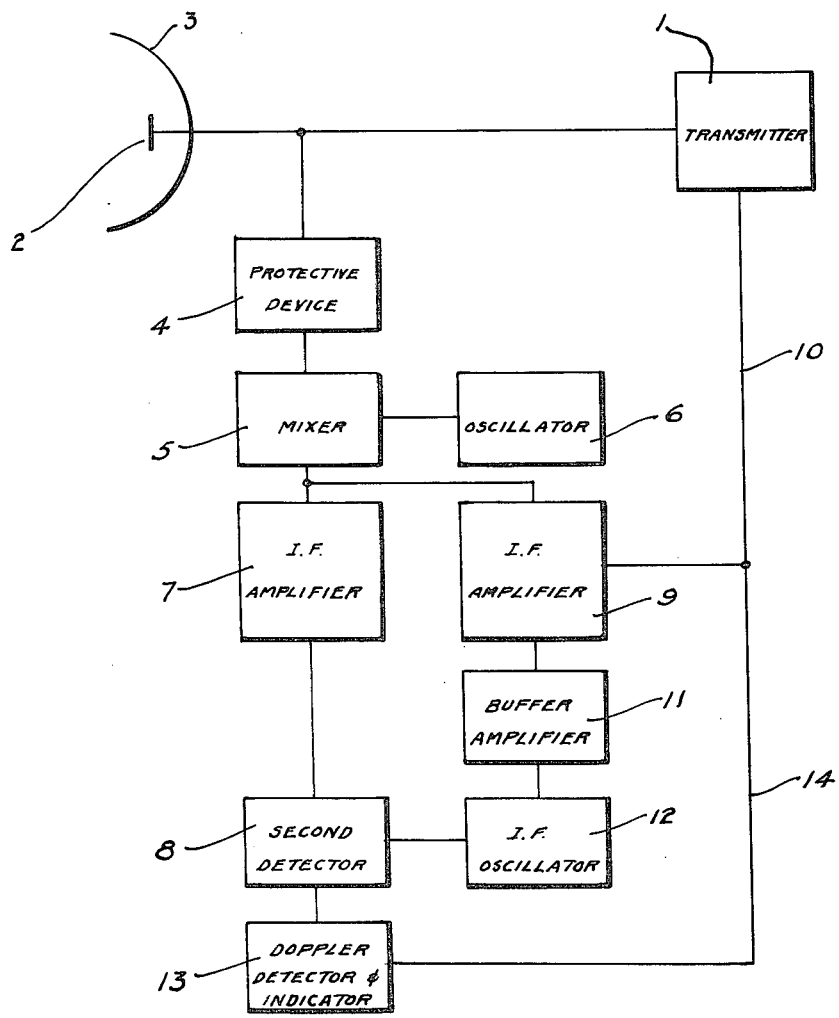
Fig. 1 is a block schematic diagram of one system constructed according to the invention.

Fig. 1 shows a system employing a common transmitting and receiving dipole 2 in a reflector 3. A transmitter 1 feeds pulsed radio-frequency oscillations to the aerial system, and a protective device 4 is inserted between the aerial system and the mixer 5 of the receiver.

The device 4 ensures that the transmitter pulse does not damage the mixer, but allows an attenuated pulse to pass and mix with local oscillations from oscillator 6. The mixer feeds two intermediate-frequency amplifiers 7 and 9, the former feeding a second detector 8.

Amplifier 9 contains one or more valves which are biased to cutoff, and is normally inoperative; positive-going pulses at transmitter pulse recurrence frequency are however, fed to these valves over lead 10 to render the amplifier operative for the duration of the pulses, so that the amplifier acts as a gate circuit; and it is arranged that the gate is open while the transmitter pulses are operative on the receiver mixer 5.

Intermediate-frequency oscillations from amplifier 9 are fed through a buffer amplifier 11 to an intermediate-frequency oscillator 12, and the latter is thus locked in phase at the beginning of each pulse recurrence period, with the intermediate-frequency oscillations in pulses derived from the transmitted pulses so that its phase is always positively related to the phase of the transmitted signals.

Continuous reference oscillations from oscillator 12 are fed to the second detector 8, or, in a modified arrangement, to a stage in amplifier 7. Received signals from moving objects beat with the reference oscillation to produce beat components at Doppler frequency, whereas signals from stationary objects produce no such beats.

Device 13 comprises any known or suitable means for detecting the Doppler beat components and utilising them to give an audible or visual warning or indication: it may conveniently include wave filter for selecting Doppler-frequency components, and if a cathode ray tube indicator is arranged to present moving targets in range, or in range and bearing substantially free from clutter, locking pulses from the transmitter are provided over lead 14 to lock the time base of the indicator.

Figure 2:
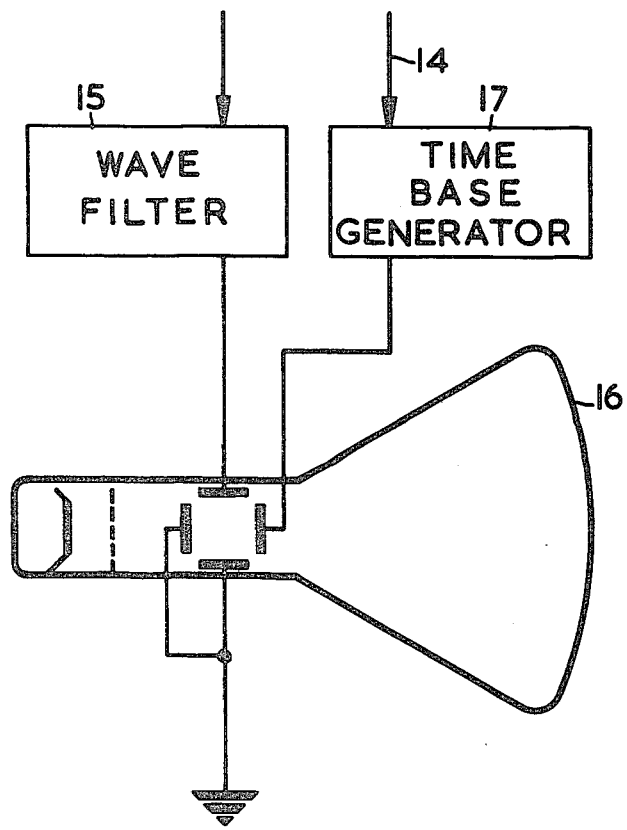
Fig. 2 is a block schematic diagram illustrating in further detail part of the system shown in Fig. 1 and in particular a portion of the Doppler detector and indicator block 13.

Fig. 2 shows the preferred components of detector-indicator 13. These comprise a wave filter 15 and a ray tube 16 with a time base generator 17 connected as shown. It will be understood that the invention is not to be restricted to the precise details of construction disclosed above as various changes and modifications may be made therein without departing from the spirit of the insertion or sacrificing the advantages disclosed from its use.

I claim:

1. A radar system for the location of moving objects comprising, an antenna means, pulsed radio frequency transmitter means, first circuit means connecting said transmitter and antenna means, mixer means connected to said first circuit means, local oscillator means connected to said mixer means, a first intermediate frequency amplifier means, a second circuit means connecting said first amplifier means and said mixer, a detector means connected to said amplifier means, indicating means connected to said detector means, a second intermediate frequency amplifying means connected to said second circuit means and said transmitter means, buffer amplifier means connected to said second intermediate amplifier means, and intermediate frequency oscillator means connected to both said buffer amplifier means and said detector means.

2. The combination set forth in claim 1, said indicating means comprising a cathode ray tube having a time base generator, means connected to said transmitter means and said time base generator to lock the time sweep signal and the transmitting pulse in a fixed relation.

3. A radar system for the location of moving objects comprising, an antenna means, pulsed radio frequency transmitter means, first circuit means connecting said transmitter and antenna means, mixer means connected to said first circuit means local oscillator means connected to said mixer means, a first intermediate frequency amplifier means, a second circuit means connecting said first amplifier means and said mixer means, a detector means connected to said amplifier means, indicator means connected to said detector means, a second intermediate frequency amplifier means connected to said second circuit means and the said transmitter means, an intermediate frequency oscillator means connected to said detector means and a third circuit means connecting said second amplifier and said intermediate frequency oscillator means.

4. A radar system for the location of moving objects comprising, an antenna means, pulsed radio frequency transmitter means, first circuit means connecting said transmitter and antenna means, mixer means connected to said first circuit means local oscillator means connected to said mixer means, a first intermediate frequency amplifier means, a second circuit means connecting said first amplifier means and said mixer means, a detector means connected to said amplifier means, indicator means connected to said detector means, a second intermediate frequency amplifier means connected to said second circuit means, gating means included in said second amplifier means and connected to said transmitter means, an intermediate frequency oscillator means connected to said detector means and a third circuit means connecting said second amplifier and said intermediate frequency oscillator means.

5. In combination in a radar system for the location of moving objects, an antenna, pulsed radio frequency transmission means connected to said antenna, mixer means, a local oscillator means connected to said mixer, a first intermediate frequency amplifier means connected to said mixer means, detector means connected to said amplifier means, indicating means connected to said detector means, a second intermediate amplifier means connected to said transmission means, buffer amplifier means connected to said second amplifier means, and intermediate frequency oscillator means connected to both said buffer amplifier means and said detector means.

6. In combination in a radar system employing the Doppler effect for the location of moving objects, directional antenna means, a high frequency radio signal circuit comprising a high frequency pulsed transmitter, a high frequency receiver and means to connect said circuit to said antenna means, mixer means having an oscillator, a detector means connected to said mixer means, intermediate frequency oscillator means connected to said detector means and to said mixer means on the opposite side thereof from said antenna means and doppler detector and indicator means connected to said detector means and to said pulsed transmitter.

7. The combination set forth in claim 6, said Doppler detector and indicator means comprising a cathode ray tube having a time base generator connected to both said circuit and one set of deflection plates of said tube and a wave filter connected to both said circuit and the other set of deflection plates of said tube.

8. In combination in a radar system employing the Doppler effect for the location of moving objects, directional antenna means, a circuit network connected to said antenna means, mixer means, a first amplifier means, detector means and a doppler indicator means forming a branch of said network, a high frequency pulsed transmitter forming another leg of said network, an intermediate frequency pulsed transmitter forming another leg of said network, an intermediate frequency oscillator, a second amplifier means, said oscillator being connected through said second amplifier to said mixer on the detector side thereof to achieve a phase lock, said transmitter being connected to said antenna means, said second amplifier means and said indicator means.

ARTHUR E. BAILEY.

References Cited in the file of this patent
UNITED STATES PATENTS

| Number | Name | Date |
|---|---|---|
| 2,406,316 | Blumlein | Aug. 27, 1946 |
| 2,407,198 | Wolff | Sept. 3, 1946 |
| 2,422,064 | Anderson | June 10, 1947 |
| 2,468,751 | Hansen | May 3, 1949 |
| 2,479,568 | Hansen | Aug. 23, 1949 |
| 2,480,829 | Barrow | Sept. 6, 1949 |
| 2,492,012 | Smith | Dec. 20, 1949 |
| 2,512,144 | Emslie | June 20, 1950 |
| 2,535,274 | Emslie | Dec. 26, 1950 |
| 2,543,448 | Emslie | Feb. 27, 1951 |
| 2,543,449 | Emslie | Feb. 27, 1951 |